(12) United States Patent
Schäperclaus et al.

(10) Patent No.: US 11,350,604 B2
(45) Date of Patent: Jun. 7, 2022

(54) MILK METER FOR MEASURING A FLOW RATE OF A MILK FLOW

(71) Applicant: N.V. Nederlandsche Apparatenfabriek NEDAP, Groenlo (NL)

(72) Inventors: Edwin Schäperclaus, Neede (NL); Martin Jeroen van Dijk, Enschede (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 153 days.

(21) Appl. No.: 16/215,861

(22) Filed: Dec. 11, 2018

(65) Prior Publication Data
US 2019/0234785 A1 Aug. 1, 2019

(30) Foreign Application Priority Data

Dec. 11, 2017 (NL) ...................................... 2020053

(51) Int. Cl.
*G01F 15/02* (2006.01)
*A01J 5/01* (2006.01)
(Continued)

(52) U.S. Cl.
CPC ...................................... *A01J 5/01* (2013.01); *G01F 1/52* (2013.01); *G01F 15/005* (2013.01); *G01F 15/02* (2013.01); *G01F 23/303* (2013.01); *G01F 23/72* (2013.01)

(58) Field of Classification Search
CPC .... A01J 5/01; A01J 7/022; A01J 7/027; A01J 9/06
See application file for complete search history.

(56) References Cited

U.S. PATENT DOCUMENTS 3,919,975 A * 11/1975 Duncan ..................... G01F 3/38
119/14.05
4,190,021 A * 2/1980 Reisgies ............... A01J 5/0075
119/14.08
(Continued)

FOREIGN PATENT DOCUMENTS

EP 0 023 449 A1 2/1981
EP 0 052 396 A2 5/1982
(Continued)

OTHER PUBLICATIONS

International Search Report and Written Opinion, dated Jul. 2006 (11 pages).

*Primary Examiner* — Tran M. Tran
(74) *Attorney, Agent, or Firm* — Jacobson Holman PLLC

(57) ABSTRACT

A milk meter for measuring a flow rate of milk, having an inlet, an outlet, and a liquid flow path from the inlet to the outlet, the milk meter has a stabilization chamber in the liquid flow path and a float in the stabilization chamber configured to float on the milk, wherein the milk meter is configured so the level of milk in the stabilization chamber depends on the flow rate of the milk flow, the milk meter also has a magnetic unit for generating a magnetic field in the stabilization chamber, which varies in a height direction of the stabilization chamber, the float contains an electronic measuring unit for measuring the strength of the magnetic field, which is a measure of the height within the stabilization chamber of the float and the strength of the magnetic field measures the flow rate of the milk.

22 Claims, 10 Drawing Sheets

(51) Int. Cl.
*G01F 23/72* (2006.01)
*G01F 23/30* (2006.01)
*G01F 1/52* (2006.01)
*G01F 15/00* (2006.01)

(56) References Cited

U.S. PATENT DOCUMENTS

| | | | | |
|---|---|---|---|---|
| 4,231,324 A | * | 11/1980 | Schletter | A01J 5/01 119/14.17 |
| 4,253,421 A | * | 3/1981 | Slater | A01J 5/01 119/14.08 |
| 4,295,490 A | * | 10/1981 | Boudreau | A01J 5/04 137/635 |
| 4,306,590 A | * | 12/1981 | Boudreau | A01J 5/04 137/183 |
| 4,437,346 A | * | 3/1984 | Kummer | A01J 5/01 73/198 |
| 4,440,110 A | * | 4/1984 | Hicks | A01J 5/01 119/14.08 |
| 4,495,799 A | * | 1/1985 | Fisher | B01D 35/143 73/61.73 |
| 4,516,530 A | * | 5/1985 | Reisgies | A01J 5/017 119/14.08 |
| 4,724,864 A | * | 2/1988 | Schwelm | G05D 7/005 137/486 |
| 4,877,160 A | * | 10/1989 | Derving | F16K 15/147 222/494 |
| 4,989,445 A | * | 2/1991 | Moskvin | A01J 5/01 73/861 |
| 5,161,483 A | * | 11/1992 | Moskvin | A01J 5/01 119/14.17 |
| 5,195,456 A | * | 3/1993 | van der Lely | G01F 3/38 119/14.09 |
| 5,813,432 A | * | 9/1998 | Elsdon | B60K 15/04 137/413 |
| 6,852,172 B1 | * | 2/2005 | Lidman | A01J 7/022 134/169 C |
| 7,882,801 B2 | * | 2/2011 | Akerman | A01J 5/0134 119/14.02 |
| 8,136,634 B2 | * | 3/2012 | Paluncic | F16N 25/02 184/7.4 |
| 8,191,507 B2 | * | 6/2012 | Persson | A01J 7/022 119/14.18 |
| 8,397,671 B2 | * | 3/2013 | Hanskamp | A01J 5/08 119/14.38 |
| 8,671,883 B2 | * | 3/2014 | Umegard | A01J 5/013 119/14.02 |
| 8,695,532 B2 | * | 4/2014 | Sandberg | A01J 5/048 119/14.02 |
| 9,763,421 B2 | * | 9/2017 | Torgerson | A01J 5/0075 |
| 9,930,862 B2 | * | 4/2018 | Hofman | A01J 3/00 |
| 10,258,016 B2 | * | 4/2019 | Bosma | A01J 7/04 |
| 10,492,459 B2 | * | 12/2019 | Van Tilburg | A01J 9/06 |
| 10,502,330 B2 | * | 12/2019 | Balkenhol | A01J 7/02 |
| 10,636,596 B2 | * | 4/2020 | Duksa | G01F 1/206 |
| 11,206,805 B2 | * | 12/2021 | Stuessel | F16L 55/07 |
| 2019/0191657 A1 | * | 6/2019 | Enickl | G01F 25/0007 |

FOREIGN PATENT DOCUMENTS

EP 0 057 267 A1 8/1982
NL 2017924 B1 6/2018

\* cited by examiner

MILK METER FOR MEASURING A FLOW RATE OF A MILK FLOW

BACKGROUND OF THE INVENTION

The invention relates to a milk meter for measuring a flow rate of a milk flow, provided with an inlet to which, in use, the milk flow is supplied, an outlet where the milk flow leaves the milk meter, in use, and a liquid flow path extending from the inlet to the outlet. Such a milk meter is known from Dutch patent application 2017924.

SUMMARY OF THE INVENTION

An object of the invention is to improve the known milk meter. To this end, in the liquid flow path a valve is included which can selectively take up a first or second valve position where in the first valve position at least a first part of the liquid path is open and in the second valve position at least the first part of the liquid path is closed, while the valve is provided with an operating opening, the milk meter being configured such that:

if at the operating opening a first pressure prevails and upstream of the valve in the liquid flow path a second pressure prevails, with the first pressure being higher than the second pressure and the difference between the first and the second pressure being greater than a first predetermined value, the valve takes up the first valve position;

if at the operating opening a third pressure prevails and upstream of the valve in the liquid flow path a fourth pressure prevails, with the difference between the third pressure and the fourth pressure being less than a predetermined second value, and the third pressure and the fourth pressure each being less than the first pressure, the valve is in the second valve position;

and if at the operating opening a fifth pressure prevails and upstream of the valve in the liquid flow path a sixth pressure prevails, with the difference between the fifth pressure and the sixth pressure being less than a predetermined third value, and the fifth pressure and the sixth pressure each being greater than the second pressure, the valve is in the second valve position. Such a milk meter can be easily operated depending on the status of the milk meter. Thus, the milk meter with the valve in the first valve position can be used during milking to measure the flow rate. This valve position can be achieved by choosing the first pressure to be atmospheric and the second pressure to be a vacuum pressure. This vacuum pressure is on hand during milking in the milking system in which the milk meter is applied. The atmospheric pressure is on hand in any case. Further, the milk meter with the valve in the second valve position can be cleaned with cleaning liquid. This valve position can be achieved by choosing the third and fourth pressure to be a vacuum pressure. This vacuum pressure is on hand in the milking system in which the milk meter is applied. Finally, the valve can be in the second valve position when it is not used. The system is at rest then. This can be simply realized by choosing the fifth and sixth pressure to be an atmospheric pressure which is always on hand at rest.

In a practical embodiment, it holds in particular that the valve is provided with a housing in which a cylinder is included, a piston which is movably included in the cylinder, a first inlet opening and an outlet opening, while the piston and the cylinder can move relative to each other between a first and second position and the valve is furthermore provided with a spring element which presses the cylinder and the piston relative to each in the direction of the second position, while in the first position the valve takes up the first valve position and a first fluid connection between the first inlet opening and the outlet opening is cleared and in the second position the valve takes up the second valve position and the first fluid connection between the first inlet opening and the outlet opening is blocked, while the operating opening is in fluid communication with a space within the cylinder, and the inlet opening is in fluid communication with a space outside the cylinder within the housing, and wherein a pressure at the operating opening which is greater than a pressure which prevails in the space within the housing outside the cylinder presses the cylinder and the piston relative to each other in the direction of the first position against the force of the spring element.

The invention will be further elucidated on the basis of the drawing, in which.

DETAILED DESCRIPTION OF THE INVENTION

Figure 1A:
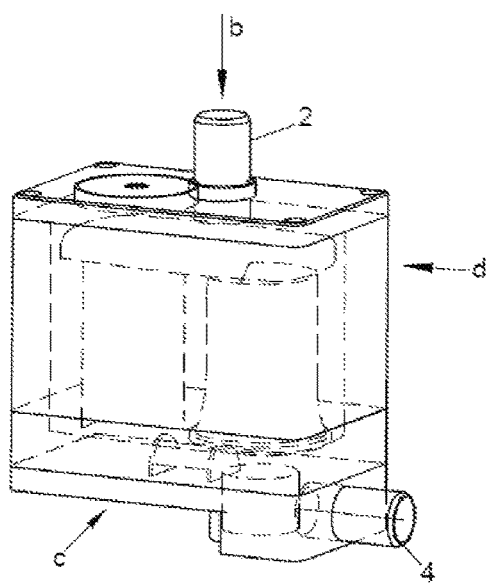
FIG. 1A shows a transparent view of a possible embodiment of the milk meter according to the invention.

In FIG. 2, with reference numeral 1 a possible embodiment of a milk meter according to the invention is indicated. The milk meter is provided with an inlet 2 into which, in use, the milk flow whose flow rate is to be measured is supplied. Further, the milk meter is provided with an outlet 4 where the milk flow whose flow rate has been measured, in use, leaves the milk meter again. Between the inlet and the outlet extends a liquid flow path (also: liquid path) 5 which is schematically indicated in the drawing with a broken line. Obviously, the broken line concerns just one possible pathway along which the milk flow can proceed; reason why the representation is schematic.

The milk meter is provided with a stabilization chamber 6 which is also included in the liquid flow path 5. The milk meter is furthermore provided with a float 8 which is in the stabilization chamber and which is configured to float on the milk of the milk flow that, in use, is in the stabilization chamber. The milk meter is configured such that a level of the milk in the stabilization chamber (the height of the liquid surface of the milk in the stabilization chamber) depends on the flow rate of the milk flow. In this example, it holds that the height of the level of the milk in the stabilization chamber increases when the flow rate increases. The milk meter is further provided with a sensor device for determining the flow rate of the milk flow through the milk meter. To this end, in an example, the sensor device comprises an electronic measuring unit 12.

The milk meter is further provided with a magnetization unit 10 for generating a magnetic field in the stabilization chamber. The magnetic field that is generated is such that the magnetic field strength varies in a height direction h of the stabilization chamber. In the float, the electronic measuring unit 12 is arranged for measuring the strength of the magnetic field. The strength of the magnetic field is also referred to as a magnetic flux. The measured strength of the magnetic field is a measure of the height at which the float is floating on the milk in the stabilization chamber. Because the height at which the float is floating within the stabilization chamber, in turn, is determined by the flow rate of the milk flow, in this way information about the flow rate is obtained. To put it differently, the flow rate is measured in this manner.

Figure 3:
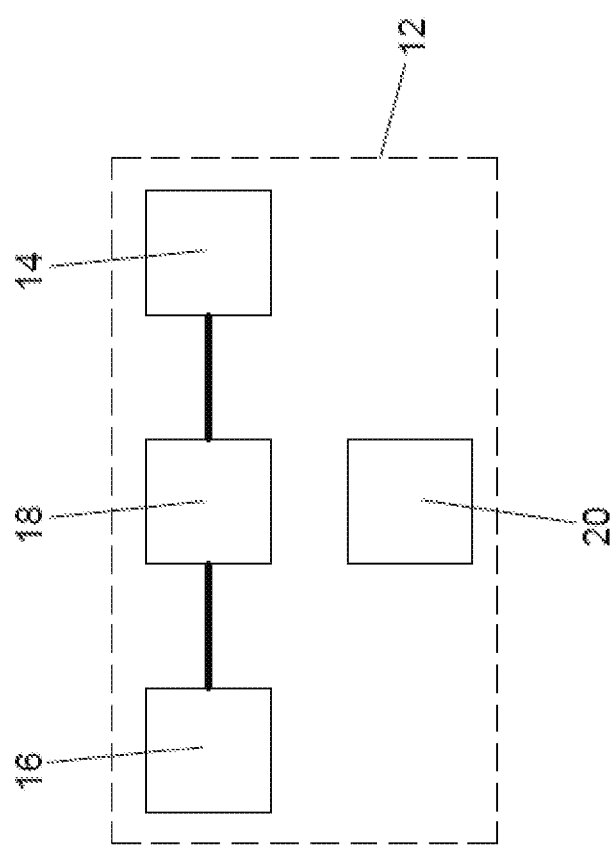
FIG. 3 shows a possible embodiment of the measuring unit of the milk meter of FIG. 1A.

As can be seen in FIG. 3, the electronic measuring unit is provided with a transmitter unit 14 for emitting a signal which comprises information about the measured flow rate of the milk flow. The electronic measuring unit is further provided with a Hall sensor 16 for detecting the magnetic field and a processor 18 for processing measuring signals from the Hall sensor to obtain information about the flow rate of the milk flow, which is emitted with the aid of the transmitter unit 14. The electronic measuring unit 12 is further provided with a supply 20 for providing a supply voltage for the processor and the transmitter unit.

The milk meter in this example is further provided with a buffer reservoir 24 which is included upstream of the stabilization chamber in the liquid flow path 5. Provided in a sidewall 26 of the buffer reservoir is an outflow opening which extends from a lowest point 30 of the outflow opening upwardly in the direction h and which is in fluid communication with the outlet 4. In this example, it holds that the outflow opening 28 is in fluid communication with the outlet 4 via an outflow channel 32. A top of the buffer reservoir is provided with an inlet opening 34 which is in fluid communication with the inlet 2. The buffer reservoir 24 and the stabilization chamber 6 are connected with each other via a fluid connection 36. The construction is such that the buffer reservoir 24, the fluid connection 36 and the stabilization chamber 6, in use, function as communicating vessels so that, in use, a level of the milk in the stabilization chamber (measured in the direction h) is equal to a level of the milk in the buffer reservoir (likewise measured in the direction h).

In this example, it holds that a bottom 38 of the buffer reservoir, and a bottom 40 of the fluid connection 36 are at a greater height than a bottom 42 of the stabilization chamber. The buffer reservoir and the stabilization chamber can be directly or indirectly open to an environment formed in a milking system for milking animals in which the milk meter is included, for instance via small apertures at a top of the buffer reservoir and the stabilization chamber (not shown). This environment of the system typically has a somewhat reduced pressure P2 (also referred to as vacuum pressure) relative to the air pressure (also referred to as atmospheric pressure P1). This has as a consequence that the buffer reservoir, the stabilization chamber and the fluid connection function as communicating vessels, the vessels being formed by the buffer reservoir and the stabilization chamber. Clearly, in a different application, the buffer reservoir and the stabilization chamber may also be in open communication with an environment outside the milking system and hence with the space in a barn. Also, the buffer reservoir and the stabilization chamber may be in open communication with a space within the milk meter in which the buffer reservoir and the stabilization chamber are included.

Figures 2A, 2B:
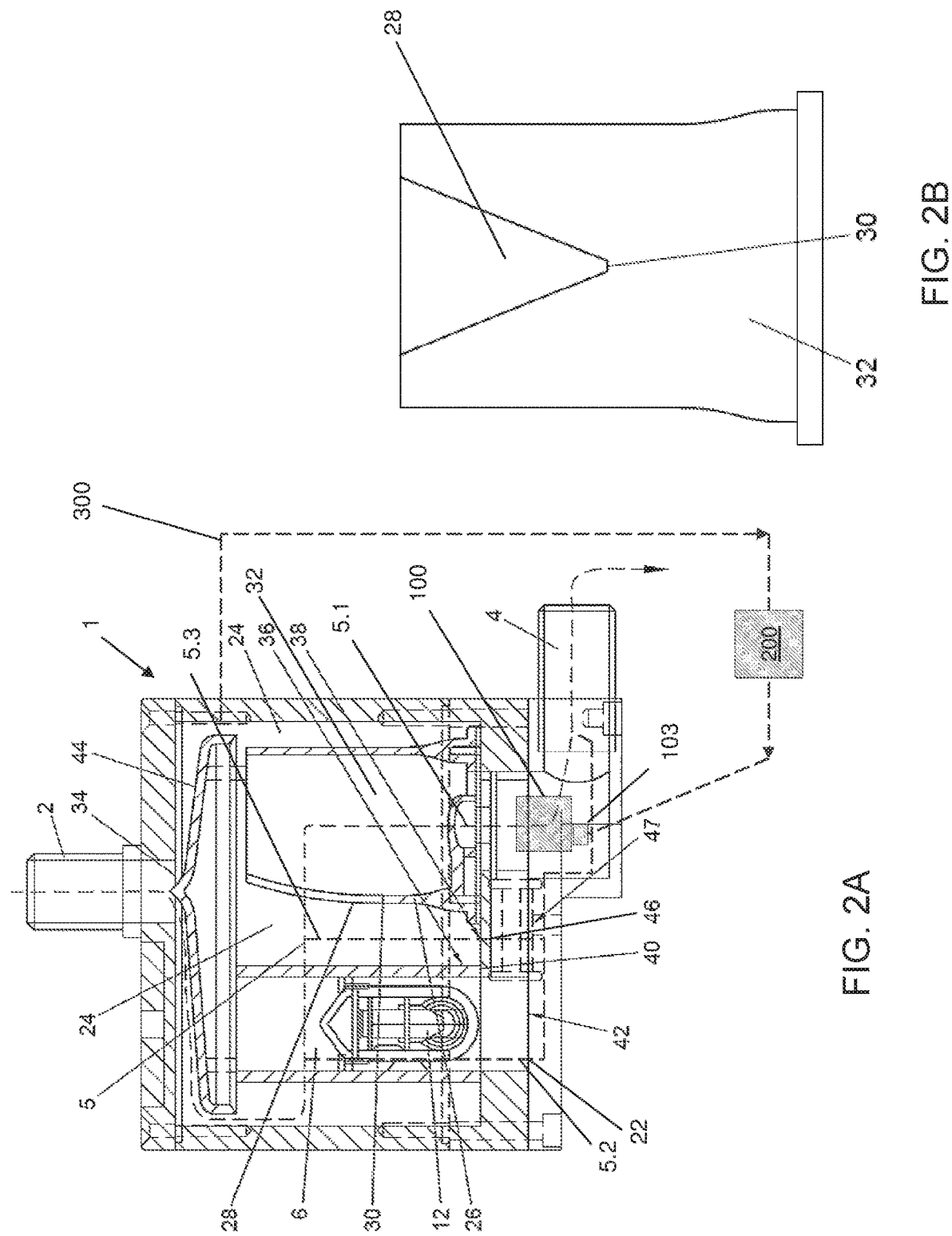
FIG. 2A shows a cross section of the milk meter along the line A-A in FIG. 1B.
FIG. 2B shows a view of an outflow channel of FIG. 1A.

As can be seen in FIG. 2B, it holds that the outflow opening 28 of the buffer reservoir has a width b which increases in upward direction (in the direction h). The lowest point 30 of the outflow opening is below a half height H of the stabilization chamber. This is merely an example. This point may, if desired, be higher or lower and the point 30 may even be on the bottom 38 of the buffer reservoir.

Figure 1B:
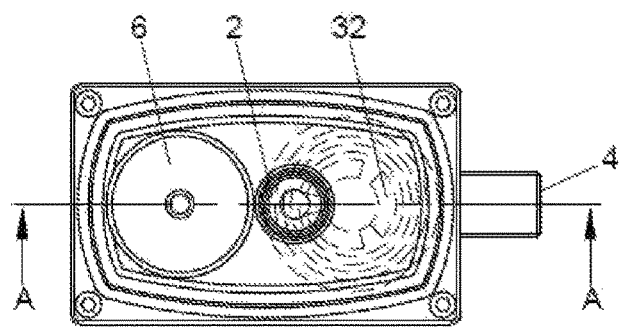
FIG. 1B shows a transparent view of the milk meter according to FIG. 1A in the direction of the arrow b in FIG. 1A according to the invention.
Figure 1C:
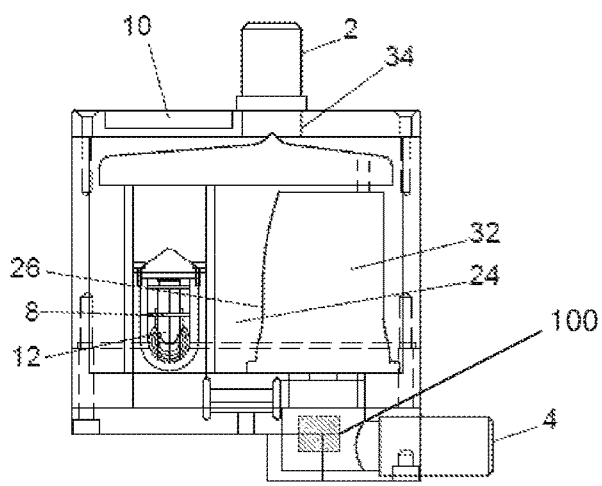
FIG. 1C shows a transparent view of the milk meter according to FIG. 1A in the direction of the arrow c in FIG. 1A according to the invention.
Figure 1D:
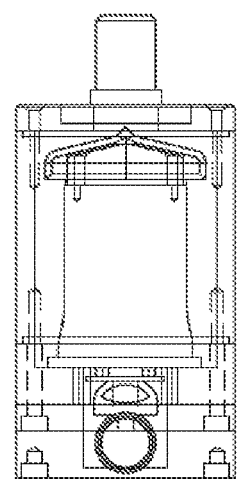
FIG. 1D shows a transparent view of the milk meter according to FIG. 1A in the direction of the arrow d in FIG. 1A according to the invention.

As can be seen in FIG. 1A and FIG. 1B, it holds that the stabilization chamber 6 in this example is of substantially cylinder-shaped design, with the buffer reservoir extending around the stabilization chamber. More particularly, it holds that the buffer reservoir also extends around the outflow channel 32 and that the stabilization chamber 6 is next to the outflow channel 32. The outflow channel in this example is likewise of substantially cylinder-shaped design. However, this is not requisite.

The milk meter is furthermore provided with a milk flow spread plate 44 which is arranged in the liquid flow path 5 between the inlet and the buffer reservoir and is positioned such that the milk flow is distributed by the plate. The magnetization unit is implemented as a permanent magnet which in this example is arranged above the stabilization chamber; more specifically, in this example under the spread plate 44. The magnetic unit may also be arranged in other places, as under the stabilization chamber. The milk meter is furthermore provided with a valve 100 which is included in the liquid flow path 5 between the outflow channel 32 and the outlet 4. In the further description of the operation of the milk meter 1 following below it is assumed that this valve 100 is open. After this further description, the particular function and properties of the valve 100 will be discussed.

The operation of the milk meter is as follows. When a liquid flow is supplied to the inlet 2, it will first come into contact with the spread plate 44. The milk then flows over the edges of the spread plate into the buffer reservoir 24. This buffer reservoir 24 will start to fill. The stabilization chamber is likewise filled with the milk via the fluid connection 36. The arrangement is such that the level of the milk in the buffer reservoir and in the stabilization chamber is the same. When the level of the milk in the buffer reservoir rises further, the level of the milk will reach the lowest point 30 of the outflow opening 28. As soon as the milk level gets higher, the buffer reservoir will start to empty via the outflow opening 28. During measurement, the level of the milk is thus equal to, or higher than, the lowest point 30. The height of the lowest point 30 is chosen such that during measurement the float will always float properly. The milk flowing out via the outflow opening 28 will flow via the outflow channel 32 to the outlet 4. When the milk level in the milk meter rises further, a larger portion of the outflow opening 28 will be below the milk level. As a result, the magnitude of the flow rate of the milk that flows through the outflow opening 28 will increase. Eventually, an equilibrium will be established between the supply of milk to the buffer reservoir and the amount of milk that leaves the buffer reservoir. This equilibrium is then also associated with a particular height of the level of the milk in the buffer reservoir. This equilibrium and hence the height of the liquid surface of the milk (here also called the level) depends on the magnitude of the flow rate at which the milk is being supplied to the inlet 2. When the flow rate of the milk that is supplied to the inlet 2 increases, there will be a short period of time in which the flow rate through the outflow opening 28 is smaller than the flow rate of the milk through the inlet. The result is that the milk level in the buffer reservoir will rise. The result of this is that the flow rate through the outflow opening 28 will increase (because a larger part of the outflow opening is below the milk level) until an equilibrium is established again between supply and discharge of milk in the buffer reservoir. When the flow rate of the milk that is supplied to the inlet 2 decreases, there will be a short period of time in which the flow rate of the milk that flows through the outflow opening 28 is greater than the flow rate of the milk that flows through the inlet. The consequence is that the milk level in the buffer reservoir will fall, as a result of which the flow rate through the outflow opening will decrease (in that a smaller part of the outflow opening is below the level of the milk (the milk surface) in the buffer reservoir) until an equilibrium is established again between supply and discharge of milk in the buffer reservoir. The milk level in the stabilization chamber (the height of the liquid surface of the milk in the stabilization chamber) will follow the milk level of the buffer reservoir. The measured strength of the magnetic field will hence be a measure of the height at which the float is floating on the milk in the stabilization chamber. Because the height at which the float is floating within the stabilization chamber, in turn, is determined by the flow rate of the milk flow, in this manner information about the flow rate is obtained. To put it differently, the flow rate is measured in this manner.

In particular, the stabilization chamber and the buffer reservoir are each further provided with relatively small outlet openings 22 and 46 which have no influence on the measurement because through these openings only a relatively small portion of the milk can flow out of the stabilization chamber and the buffer reservoir, respectively. These openings, so-called drainage openings, are provided to ensure that after use the stabilization chamber and the buffer reservoir can slowly empty via the outlet 4. These openings may also be each provided with a valve unit for opening and closing the drainage openings. The valve unit of the opening 46 is indicated by way of example in FIG. 2A with reference numeral 47. The float is of exchangeable design, so that it can be replaced when the supply is empty or when the electronics need to be updated.

Figure 4:
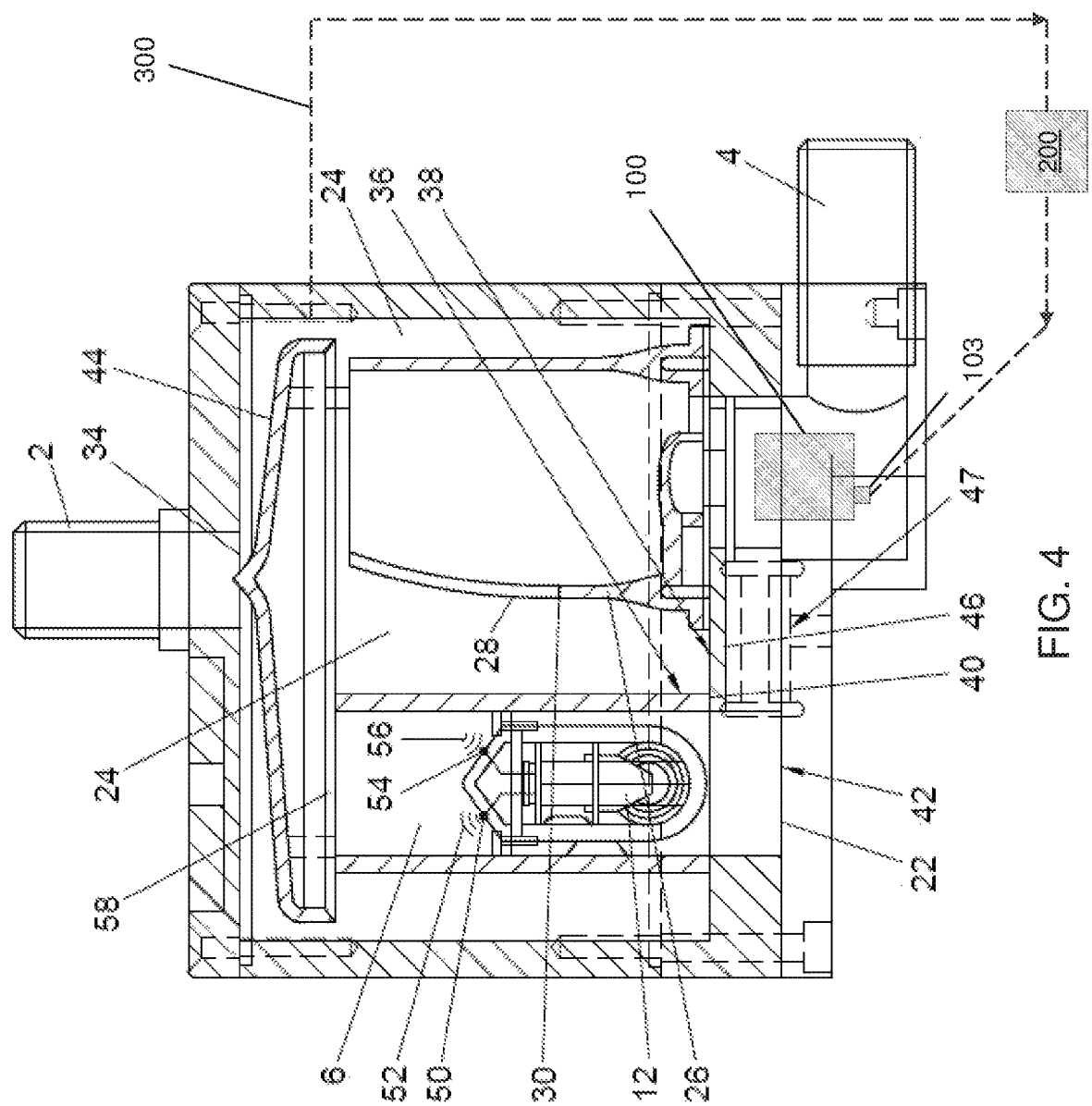
FIG. 4 shows a cross section of an alternative embodiment of a milk meter according to the invention.
Figure 5:
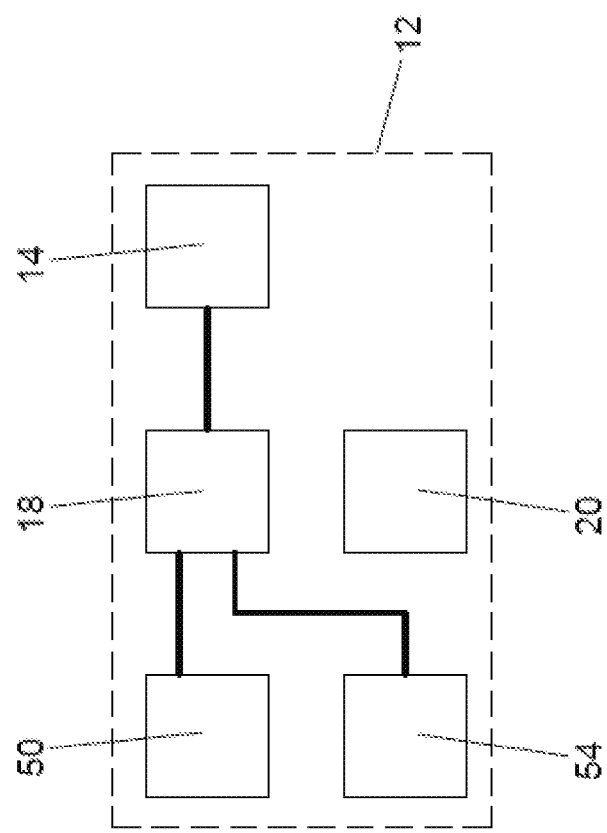
FIG. 5 shows a possible embodiment of the measuring unit of the milk meter of FIG. 4.

The invention is not in any way limited to the above-outlined embodiment. Thus, the stabilization chamber and/or the outflow channel may for instance each have the shape of a rectangular bar instead of a cylinder. The float can then likewise be of rectangular design. In this example, the stabilization chamber 6, the buffer reservoir 24, the outflow channel 32 and the fluid connection 36 are of a plastic. This provides the advantage that these parts do not influence the magnetic field. Also, the electronic measuring unit may be provided with other means than described above for contactlessly measuring the height within the stabilization chamber at which the float is floating on the milk in the stabilization chamber so that the measured height is a measure of the flow rate of the milk flow. Such a variant is shown in FIGS. 4 and 5, where parts corresponding to preceding figures are provided with the same reference numerals. The electronic measuring unit 12 is provided with a transmitter 50 for emitting up in an upward direction a pulsating electromagnetic or acoustic measuring signal 52, and a receiver 54 for receiving reflections 56 of the measuring signal on a part 58 of the milk meter that is fixed relative to the stabilization chamber. The processor 18 is configured to determine the time difference between the emission and reception of a pulse of the measuring signal, whereby the time difference is a measure of the height within the stabilization chamber at which the float is floating on the milk in the stabilization chamber and whereby hence the measured time lapse is a measure of the flow rate of the milk flow. With the aid of the transmitter unit 14, again information about the flow rate of the milk flow is emitted. Other variants are also conceivable. For instance, an inner wall of the stabilization chamber may be provided with mutually optically different markings which are separated from each other in upward direction. With an optical sensor of the measuring unit 12 which has a horizontal viewing direction, in each case, depending on the height at which the float is in the stabilization chamber, at least one defined marking can be detected. By determining which marking or markings are detected with the sensor, the height at which the float is within the stabilization chamber can be determined. The detected height is then a measure of the flow rate of the milk flow. Information about the flow rate of the milk flow can again be emitted with the transmitter unit 14.

Such variants are each understood to fall within the framework of the invention. Also, the sensor device may be arranged outside the float (see FIG. 6 where mutually corresponding parts in FIGS. 1A-2B on the one hand and FIG. 6 on the other are provided with the same reference numerals). The sensor device may, for example, be outside the stabilization chamber and be configured to measure the height of the level of the milk in the stabilization chamber, with the measured height of the level of the milk being a measure of the flow rate of the milk flow. The sensor device may then be provided, for example, with at least one sensor, such as an optical sensor, to measure the height of the level of the milk. The walls of the stabilization chamber may be transparent for this purpose. Also, the sensor device which is arranged, for example, outside the stabilization chamber may be configured to measure the height at which the float is floating on the milk in the stabilization chamber, with the measured height of the float being a measure of the flow rate of the milk flow. The sensor device may then be provided, for example, with at least one sensor, such as an optical sensor, to measure the height at which the float is within the stabilization chamber. The walls of the stabilization chamber may again be transparent for this purpose.

The milk meter according to FIG. 1, as has been mentioned, is further provided with valve 100. The valve 100 can selectively take up a first or second valve position where in the first valve position at least a first part 5.1 of the liquid path 5 is open and in the second valve position at least the first part 5.1 of the liquid path 5 is closed. The first part 5.1 of the liquid flow path in this example is the part of the liquid flow path 5 that extends upstream of the valve through the outflow channel 32. That part of the liquid flow path 5 that extends from the inlet 2 to the outlet 4 via the drainage openings 22 and 46 hence cannot be closed off by the valve 100 and this concerns, respectively, a second part 5.2 (via drainage opening 22) and third part 5.3 (via drainage opening 46) of the liquid flow path 5. The valve is provided with an operating opening 103, the milk meter being configured such that:

if at the operating opening a first pressure prevails and upstream of the valve 100 in the liquid flow path 5 a second pressure prevails, with the first pressure being higher than the second pressure and the difference between the first and the second pressure being greater than a first predetermined value, the valve 100 takes up the first valve position;

if at the operating opening 103 a third pressure prevails and upstream of the valve in the liquid flow path a fourth pressure prevails, with the difference between the third pressure and the fourth pressure being less than a predetermined second value, and the third pressure and the fourth pressure each being less than the first pressure, the valve 100 is in the second valve position; and if at the operating opening 103 a fifth pressure prevails and upstream of the valve in the liquid flow path a sixth pressure prevails, with the difference between the fifth pressure and the sixth pressure being less than a predetermined third value, and the fifth pressure and the sixth pressure each being greater than the second pressure, the valve is in the second valve position. The operating opening 103 in this example is connected to a schematically shown pressure selection means 200 with which selectively a pressure at the operating opening can be set. During milking, as has been mentioned, the second pressure will be a relatively low pressure P2 (lower than the atmospheric pressure P1) which in technical jargon is also referred to as the vacuum pressure of a milking system. With the pressure selection means 200, then, as a pressure at the operating opening 103, an atmospheric pressure P1 is selected as the first pressure. The consequence is that the valve 100 is open and milk can flow through the valve as discussed above. If the milk meter is not used, it will empty via the outflow channel 32 and the drainage openings 22 and 46.

If the milk meter 1 is empty, it can be cleaned. In that case, upstream of the valve in the liquid flow path the fourth pressure will prevail which in this example is equal again to the vacuum pressure P2 mentioned above. In this example, with the pressure selection means 200, as a third pressure at the operating opening a pressure will be selected which in this example is also about equal to the vacuum pressure P2. The result is that the valve 100 will close. Now that the valve has closed, via the inlet 2 a cleaning liquid known per se can be introduced into the milk meter to clean the milk meter. This liquid can then remain in the buffer reservoir 24, stabilization chamber 6 and outflow channel 32 for a while. After the cleaning action of the cleaning liquid, with the pressure selection unit the first pressure is selected again and upstream of the valve the second pressure prevails again, which is equal to the fifth pressure in this example. As a result, the valve will open again, so that the cleaning liquid can flow out of the milk meter via the outflow channel and the outlet.

If the milk meter is at rest and is not used, in this example a fifth pressure is selected with the pressure selection means 200, which is equal to the atmospheric pressure P1. Also, as sixth pressure a pressure is selected that is equal to the atmospheric pressure P1. This last can be realized by switching off the milking plant to which the milk meter is coupled. As a result, the reduced pressure in the milk meter (so, in inter alia the buffer reservoir, stabilization chamber and outflow channel 32) will disappear and take a value that is also equal to the atmospheric pressure. The pressure at the entry is then the fifth pressure and the pressure upstream of the valve 100 is then the sixth pressure. The valve will then close. The milk meter is presently in a condition that is denoted as rest: the milk meter 1 is not used and the valve 100 is closed. In this example, therefore, it holds that the first pressure, fifth pressure and sixth pressure are equal to each other. Here it holds, in this example, that the first pressure is an atmospheric pressure. An advantage is that the first and fifth pressure can be simply selected with the pressure selection means. To this end, the pressure selection means 200 may for instance comprise a valve which is opened to connect the operating opening 103 with the surroundings of the milk meter.

Figure 6:
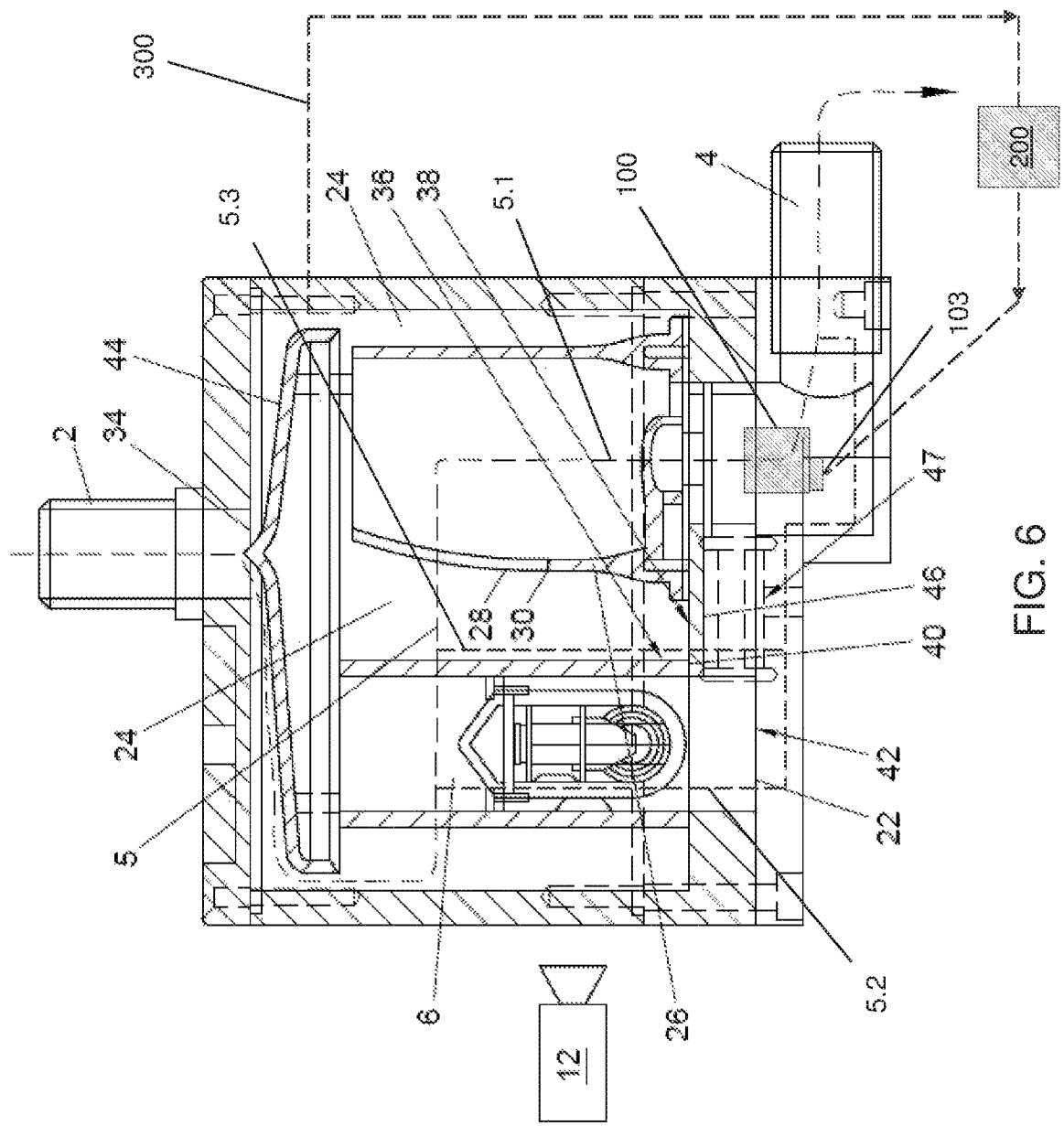
FIG. 6 shows the milk meter of FIG. 1A provided with an alternative sensor device.

Further, it holds in this example that the second pressure, third pressure and fourth pressure are equal to each other. In that regard, it holds, furthermore, that the second pressure is a vacuum pressure of a value that prevails in a milking system 1. An advantage is that the third pressure can be simply selected with the pressure selection means 200. To this end, the pressure selection means 200 may for instance comprise a (second) valve which is opened to connect the operating opening 103 with, for example, a top of the buffer reservoir through a connection 300 (see FIG. 2A) where in use the vacuum pressure concerned prevails. Accordingly, it holds, in particular, that the vacuum pressure is a vacuum pressure that, in use, prevails upstream of the valve 100 in the liquid path 5 and/or that the vacuum pressure is a reduced pressure relative to the atmospheric pressure. This vacuum pressure, of course, can also be derived elsewhere in the milking system outside of the milk meter for control of the operating opening with the pressure selection means 200. In FIG. 4 and FIG. 6 the valve 100 and the pressure selection means 200 are also shown. Operation is entirely analogous to what has been discussed with reference to FIGS. 1-3.

Figure 7:
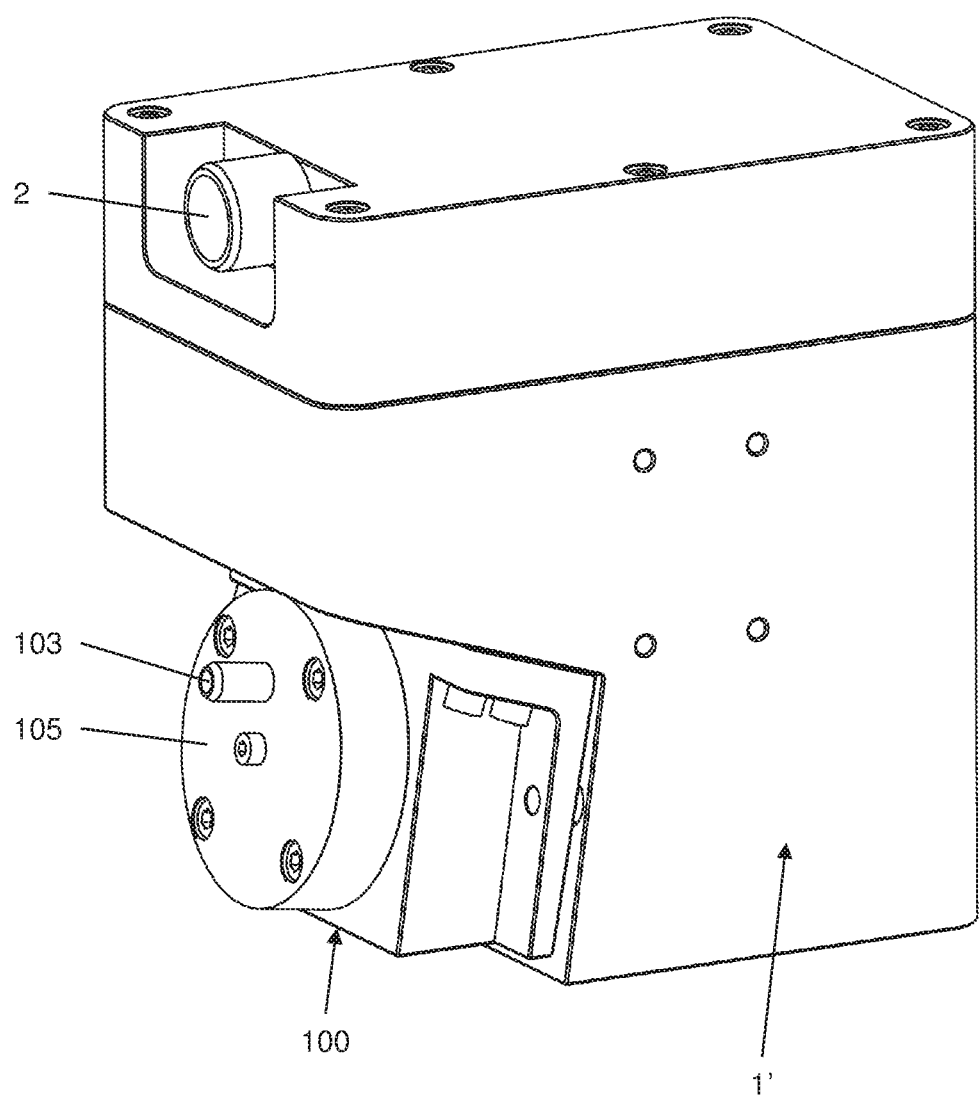
FIG. 7 shows a view of a second alternative embodiment of a milk meter according to the invention.
Figure 8:
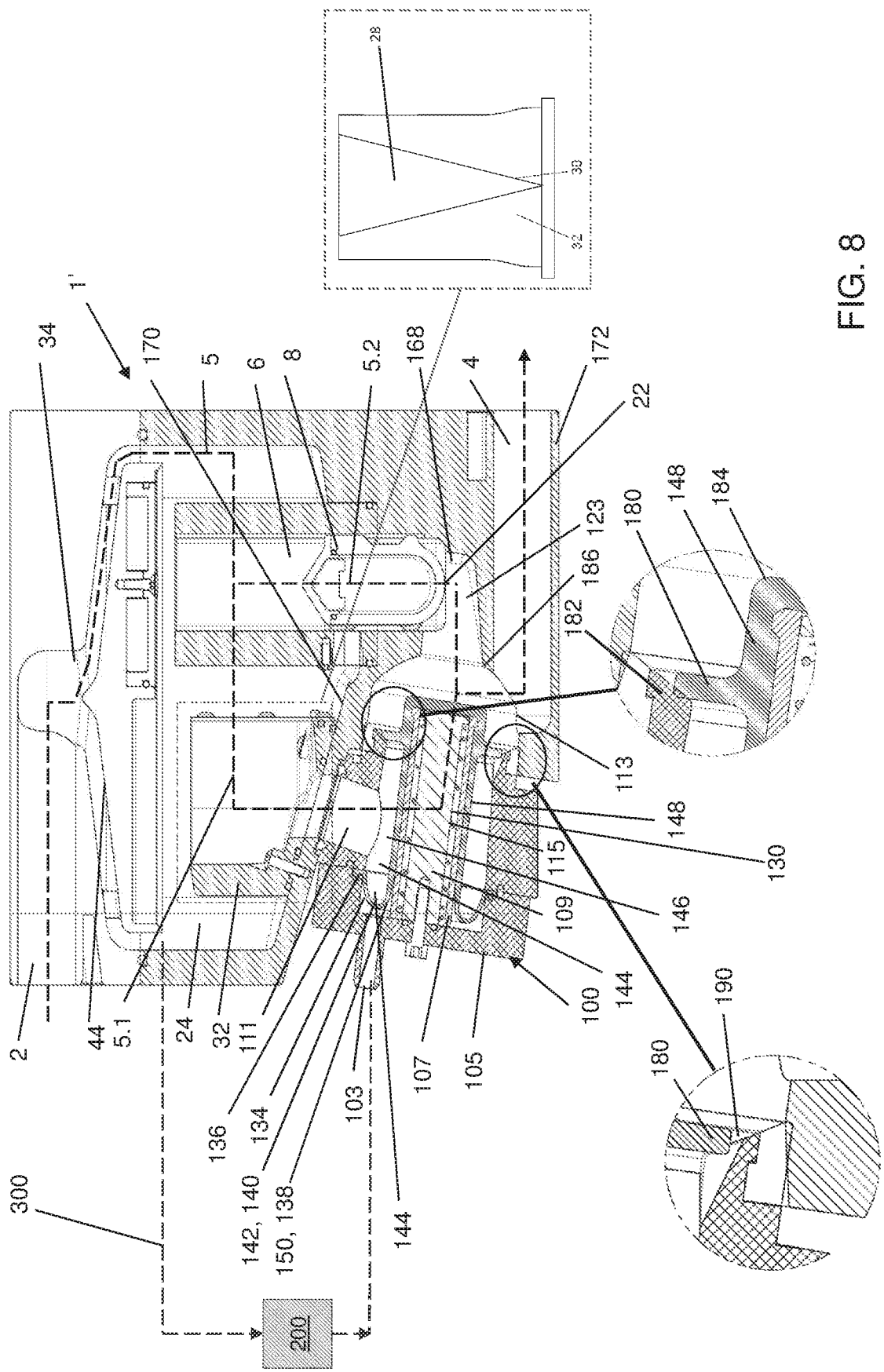
FIG. 8 shows a cross section of the milk meter according to FIG. 7 in which a valve takes up a second valve position.
Figure 9:
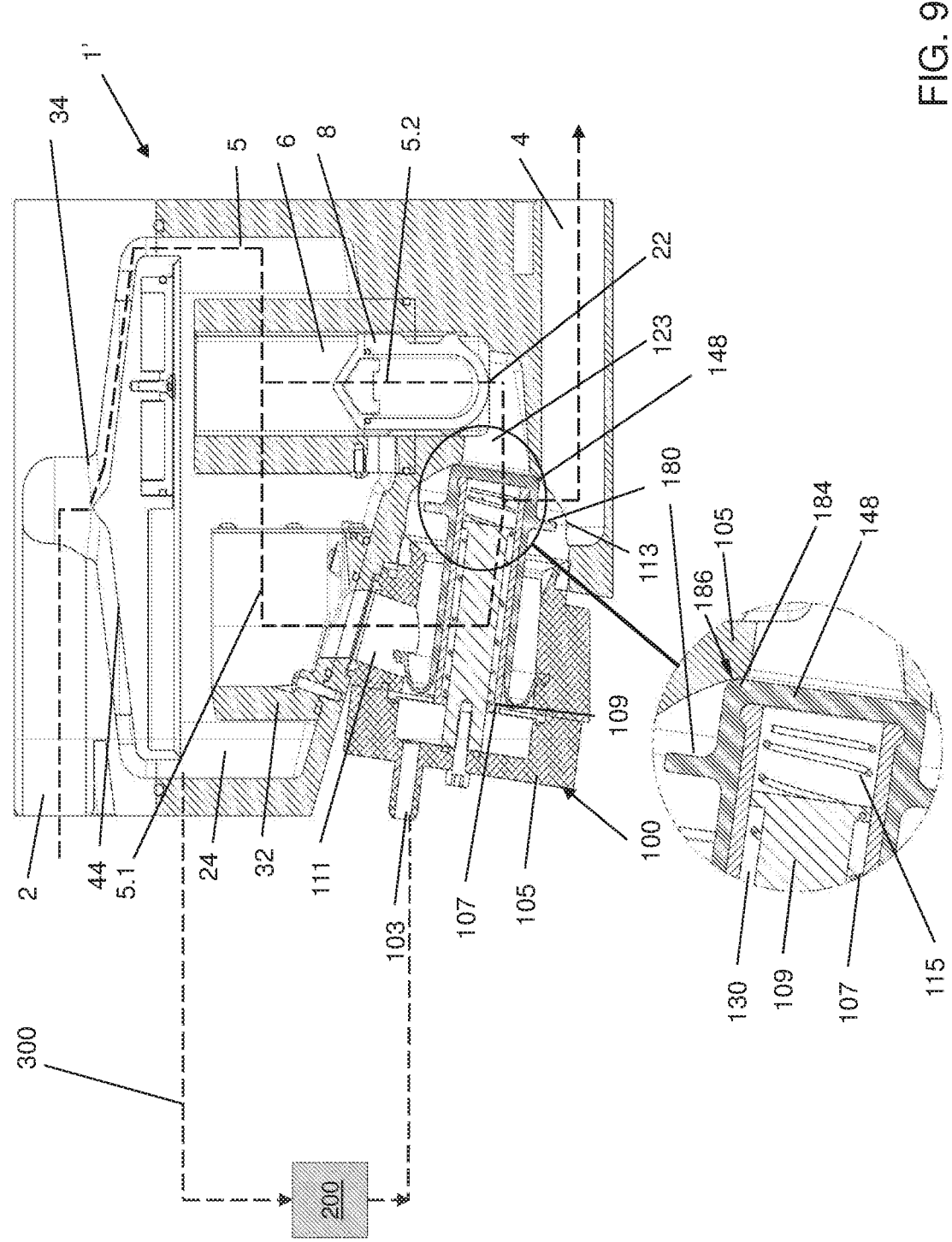
FIG. 9 shows a cross section of the milk meter according to FIG. 7 in which a valve takes up a first valve position.

In FIGS. 7-9 a fourth embodiment according to the invention is disclosed, where mutually corresponding parts in FIGS. 1-6 and FIGS. 7-9 are provided with the same reference numerals. In FIGS. 7-9 the float 8, magnetic unit 10 and/or measuring unit 12 may be implemented in accordance with each of the above-mentioned embodiments. FIGS. 7-9 are especially about the particular embodiment of the valve 100 and the position where it has been incorporated within the milk meter. The valve 100 is provided with a housing 105 in which a cylinder 107 is included, a piston 109 which is included in the cylinder 107, a first inlet opening 111 and an outlet opening 113, while the piston 109 and the cylinder 107 can move relative to each other between a first and second position. The valve 100 is furthermore provided with a spring element 115 which presses the cylinder 107 and the piston 109 relative to each other in the direction of the second position. In the first position, the valve 100 takes up the first valve position where a first fluid connection between the first inlet opening 111 and the outlet opening 113 is cleared (FIG. 9). In the second position, the valve takes up the second valve position where the first fluid connection between the first inlet opening 111 and the outlet opening 113 is blocked (FIG. 8). Blocking does not preclude there being a drainage opening 190 present, as will be set out hereinafter.

The operating opening 103 is in fluid communication with a space 130 within the cylinder 107. The inlet opening 111 is in fluid communication with a space 132 outside the cylinder within the housing 105. A pressure at the operating opening 103 which is greater than a pressure that prevails in the space 132 present within the housing 105 and outside the cylinder 107 presses the cylinder and the piston relative to each other in the direction of the first position against the force of the spring element 115. The first predetermined value is therefore a pressure difference which generates a force which presses the cylinder and the piston relative to each other to the first position and which is greater than the force of the spring element between the cylinder and the piston. In particular, the first predetermined value is in the range of 0.4-1, preferably in the range of 0.5-0.8.

Furthermore, in particular, the second predetermined value is in the range of 0-0.5, preferably in the range of 0-0.3. Preferably, the third predetermined value is in the range of 0-0.5, preferably in the range of 0-0.3. In this example, the piston 109 is fixedly connected with the housing 105 of the valve 100. The valve is furthermore provided with a flexible ring 134 of which an outer edge 136 is connected, in particular detachably, with the housing 105 of the valve 100 and of which an inner edge 138 is connected with an outer side of the cylinder 107, such that a space 140 (which is in fluid communication with the space 130 within the cylinder) contiguous to a first side 142 of the ring is in fluid communication with the operating opening, and a space 144 (which is formed by the space 132 outside the cylinder) contiguous to a second side 146 of the ring opposite the first side is in fluid communication with the first fluid connection.

The flexible ring 134 is connected with a flexible sleeve 148 in which at least a part of the cylinder 107 is included, while an opening 150 of the sleeve 148 and the inner edge 138 of the ring are connected with each other. In this example, the flexible ring 134 and the sleeve 148 are made in one piece.

Furthermore, it holds in this example that the ring and/or the sleeve are made of silicones. In particular, the function of the spring element 115 may be taken over by the flexible ring 134. The spring element 115 can then be omitted, with the flexible ring 134 forming a spring element which presses the cylinder 107 and the piston 109 relative to each other in the direction of the second position.

In this example, it holds furthermore that the first inlet opening 111 of the valve 100 is in fluid communication with the outflow opening 28 of the buffer reservoir 24, and the outlet opening 113 of the valve 100 is in fluid communication with the outlet 4 of the milk meter, the first part 5.1 of the liquid flow path 5 extending from the outflow opening 28 of the buffer reservoir to the outlet 4 of the milk meter. In the second valve position, the first part 5.1 of the liquid path is closed (FIG. 8) in that a circumferential edge 180 of the sleeve 148 closes off on a part 182 of the housing. Though, still, effectively a drainage opening 190 is present between the circumferential edge 180 of the sleeve 148 and the part 182 of the housing. Furthermore, it is apparent from FIG. 9 that in the first valve position the first part 5.1 of the liquid path 5 is open.

The valve 100 functionally also comprises a part of the housing of the milk meter and in that regard is furthermore provided with a second inlet opening 123 which is in fluid communication with the drainage opening 22 of the stabilization chamber 6, while in the first valve position at least the second part 5.2 of the liquid path 5 is closed in that a part 184 of the sleeve 148 closes off on a part 186 of the housing 105 of the valve. In the second valve position (FIG. 8), at least the second part 5.2 of the liquid path 5 is open. In the first valve position (FIG. 9), the second part 5.2 of the liquid path 5 is closed. The second part of the liquid path 5, as mentioned, extends through the drainage opening of the stabilization chamber 6 to the outlet 4 of the milk meter 1, 1'.

In the first position (FIG. 9), the valve takes up the first valve position where a second fluid connection between the second inlet opening 123 of the valve 100 and the outlet opening 113 of the valve 100 is closed. In the second position (FIG. 8), the valve 100 takes up the second valve position where the second fluid connection between the second inlet opening 123 and the outlet opening 113 is cleared. The first fluid connection of the valve 100 hence lies in the first part 5.1 of the liquid flow path 5 of the milk meter. The second fluid connection of the valve 100 hence lies in the second part 5.2 of the liquid flow path 5 of the milk meter.

In this example, it holds furthermore that a bottom 168 of the stabilization chamber is at a lower level than a bottom 170 of the buffer reservoir and/or a bottom of the outflow channel 32. Furthermore, it holds that the valve is under the buffer reservoir and at a higher level than a lowest point 172 of the outlet. In this way, the milk meter is of compact design.

Figure 10:
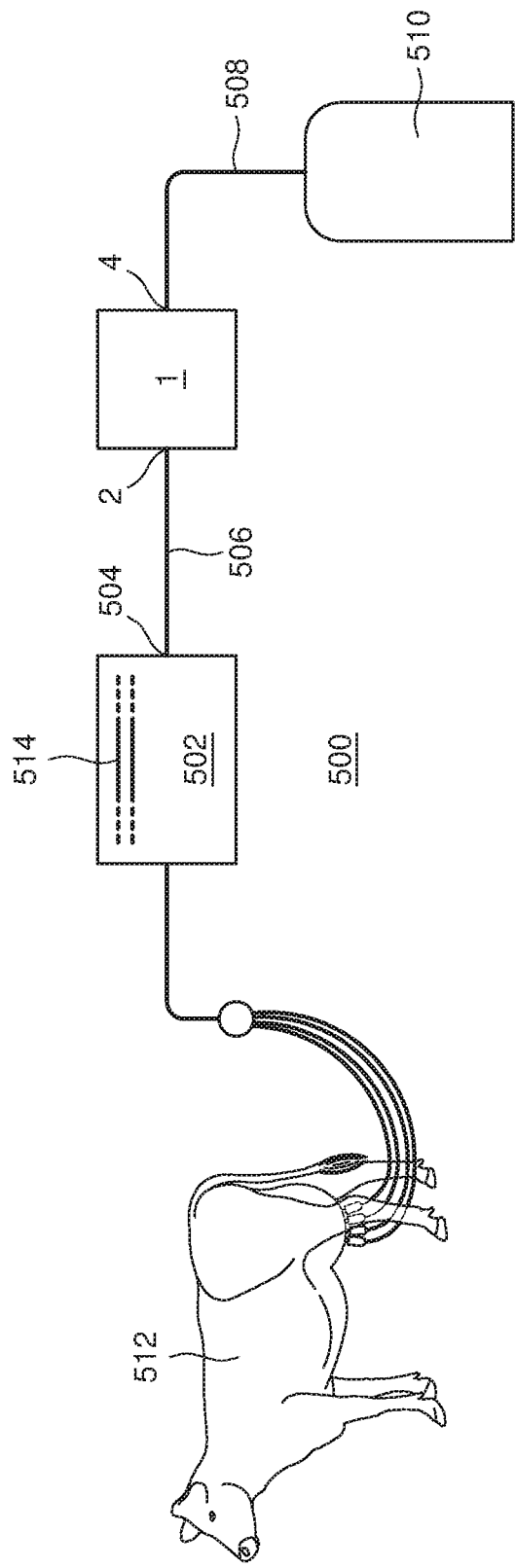
FIG. 10 schematically shows a system according to the invention comprising a milking device and a milk meter according to the invention.

As shown in FIG. 10, the invention also relates to a system 500 for milking animals. The system includes a milking device 502 for milking animals, known per se, and a milk meter 1 according to the invention. An outlet 504 of the device 502 is connected via a fluid connection 506 to the inlet 2 of the milk meter 1 according to the invention. An outlet 4 of the milk meter 1 is connected via a fluid connection 508 to a collection vessel 510 for the milk from, in this example, the animal 512. In a pipe system 514 of the milking device 502 through which the milk of the animal flows to the outlet 504 prevails the vacuum pressure which, in consequence of the fluid connection 506 between the milking device 502 and the milk meter 1, also prevails in the milk meter 1, as discussed hereinabove. The milk meter 1 measures the flow rate of the milk which is delivered by the animal 512. To put it differently, the milk meter measures a flow rate of the milk flowing through (the pipe system 514 of) the milk meter.

Claims as filed in the original Dutch patent application are partly repeated as clauses below to retain the original subject-matter.

1. A milk meter for measuring a flow rate of a milk flow, provided with an inlet to which, in use, the milk flow is supplied, an outlet where the milk flow leaves the milk meter, in use, and a liquid flow path extending from the inlet to the outlet, characterized in that in the liquid flow path a valve is included which can selectively take up a first or second valve position, wherein in the first valve position at least a first part of the liquid path is open and in the second valve position at least the first part of the liquid path is closed, wherein the valve is provided with an operating opening, the milk meter being configured such that:
   if at the operating opening a first pressure prevails and upstream of the valve in the liquid flow path a second pressure prevails, with the first pressure being higher than the second pressure and the difference between the first and the second pressure being greater than a first predetermined value, the valve takes up the first valve position;
   if at the operating opening a third pressure prevails and upstream of the valve in the liquid flow path a fourth pressure prevails, with the difference between the third pressure and the fourth pressure being less than a predetermined second value, and the third pressure and the fourth pressure each being less than the first pressure, the valve is in the second valve position;

and if at the operating opening a fifth pressure prevails and upstream of the valve in the liquid flow path a sixth pressure prevails, with the difference between the fifth pressure and the sixth pressure being less than a predetermined third value, and the fifth pressure and the sixth pressure each being greater than the second pressure, the valve is in the second valve position.

2 The milk meter according to clause 1, characterized in that the first pressure, fifth pressure and sixth pressure are equal to each other.

3. The milk meter according to clause 2, characterized in that the first pressure is an atmospheric pressure.

4. The milk meter according to any one of the preceding clauses, characterized in that the second pressure, third pressure and fourth pressure are equal to each other.

5. The milk meter according to clause 4, characterized in that the second pressure is a vacuum pressure of a value which prevails in a milking system.

6. The milk meter according to clause 5, characterized in that the vacuum pressure is a pressure which, in use, prevails upstream of the valve in the liquid flow path and/or that the vacuum pressure is a reduced pressure relative to the atmospheric pressure.

7. The milk meter according to any one of the preceding clauses, characterized in that the valve is provided with a housing in which a cylinder is included, a piston which is included in the cylinder, a first inlet opening and an outlet opening, wherein the piston and the cylinder can move relative to each other between a first and second position and wherein the valve is furthermore provided with a spring element which presses the cylinder and the piston relative to each other in the direction of the second position, wherein in the first position the valve takes up the first valve position and a first fluid connection between the first inlet opening and the outlet opening is cleared, and in the second position the valve takes up the second valve position and the first fluid connection between the first inlet opening and the outlet opening is blocked, wherein the operating opening is in fluid communication with a space within the cylinder, and the inlet opening is in fluid communication with a space outside the cylinder within the housing, and wherein a pressure at the operating opening which is greater than a pressure which prevails in the space within the housing outside the cylinder presses the cylinder and the piston relative to each other in the direction of the first position against the force of the spring element.

8. The milk meter according to clause 7, characterized in that the first predetermined value is a pressure difference which generates a force which presses the cylinder and the piston relative to each other to the first position and which is greater than the force of the spring element between the cylinder and the piston.

9. The milk meter according to any one of the preceding clauses, characterized in that the first predetermined value is in the range of 0.4-1, preferably in the range of 0.5-0.8, that the second predetermined value is in the range of 0-0.5, preferably in the range of 0-0.3 and/or that the third predetermined value is in the range of 0-0.5, preferably in the range of 0-0.3.

10. The milk meter according to at least one of the preceding clauses 7 or 8, characterized in that the piston is fixedly connected with the housing of the valve.

11. The milk meter according to any one of the preceding clauses, characterized in that the valve is furthermore provided with a flexible ring of which an outer edge is in particular detachably connected with the housing and an inner edge is connected with an outer side of the cylinder, such that a space contiguous to a first side of the ring is in fluid communication with the operating opening and a space contiguous to a second side of the ring opposite to the first side is in fluid communication with the first fluid connection of the valve, while in particular the spring element is formed by the flexible ring.

12. The milk meter according to clause 11, characterized in that the flexible ring is connected with a flexible sleeve in which at least a part of the cylinder is included while an opening of the sleeve and the inner edge of the ring are connected with each other.

13. The milk meter according to clause 12, characterized in that the flexible ring and the sleeve are made in one piece.

14. The milk meter according to any one of clauses 11-13, characterized in that the ring and/or the sleeve are made of silicones.

15. The milk meter according to any one of the preceding clauses, characterized in that the milk meter is furthermore provided with a stabilization chamber which is included in the liquid flow path and a float which is in the stabilization chamber and is configured to float on milk of the milk flow that is in the stabilization chamber, wherein the milk meter is configured such that a level of milk in the stabilization chamber depends on the flow rate of the milk flow, wherein the milk meter is provided with a buffer reservoir which is included upstream of the stabilization chamber in the liquid flow path, wherein in a sidewall of the buffer reservoir an outflow opening is provided which extends from a lowest point of the outflow opening upwardly and which is in fluid communication with the outlet, wherein a top of the buffer reservoir comprises an inlet opening which is in fluid communication with the inlet, and wherein the buffer reservoir and the stabilization chamber are connected with each other via a fluid connection, such that the buffer reservoir, the fluid connection and the stabilization chamber, in use, function as communicating vessels so that, in use, a level of the milk in the stabilization chamber is equal to a level of the milk in the buffer reservoir, wherein the milk meter is furthermore provided with at least one sensor device for determining the flow rate of the milk flow through the milk meter, wherein the milk meter is further provided with an outflow channel, wherein the outflow opening is in fluid communication with the outlet via the outflow channel.

16. The milk meter according to clause 15, characterized in that the first inlet opening of the valve is in fluid communication with the outflow opening of the buffer reservoir and the outlet opening of the valve is in fluid communication with the outlet of the milk meter, the first part of the liquid flow path extending from the outflow opening of the buffer reservoir to the outlet of the milk meter.

17. The milk meter according to clause 15 or 16, characterized in that the valve is furthermore provided with a second inlet opening which is in fluid communication with a drainage opening of the stabilization chamber, wherein in the first valve position at least a second part of the liquid path is closed and in the second valve position at least the second part of the liquid path is open, the second part of the liquid path extending through the drainage opening of the stabilization chamber to the outlet of the milk meter.

18. The milk meter according to clause 17, characterized in that in the first position the valve takes up the first valve position and a second fluid connection between the second inlet opening of the valve and the outlet opening of the valve is blocked and in the second position the valve takes up the second valve position and the second fluid connection between the second inlet opening and the outlet opening is cleared.

19. The milk meter according to at least clause 7, characterized in that the first fluid connection of the valve is in the first part of the liquid flow path of the milk meter.

20. The milk meter according to at least clause 18, characterized in that the second fluid connection of the valve is in the second part of the liquid flow path of the milk meter.

21. The milk meter according to at least clause 15, characterized in that the outflow opening of the buffer reservoir has a width which increases in upward direction.

22. The milk meter according to at least clause 15, characterized in that the lowest point of the outflow opening is below a half height of the stabilization chamber and preferably at a height higher than a lowest point of the stabilization chamber.

23. The milk meter according to at least clause 15, characterized in that the outflow channel has such dimensions that there is always a path clear for air to flow along it.

24. The milk meter according to at least clause 15, characterized in that a bottom of the stabilization chamber is at a lower level than a bottom of the buffer reservoir and/or a bottom of the outflow channel.

25. The milk meter according to at least clause 15, characterized in that the valve is under the buffer reservoir and/or at a level above a lowest point of the outlet.

26. The milk meter according to at least clause 15, characterized in that the sensor device is configured to measure the height of the level of the milk in the stabilization chamber, wherein the measured height of the level of the milk is a measure of the flow rate of the milk flow, wherein the sensor device is for instance provided with at least one sensor, such as an optical sensor, to measure the height of the level of the milk in the stabilization chamber, wherein for instance the at least one sensor is outside the stabilization chamber and/or in that the sensor device is configured to measure the height at which the float is floating on the milk in the stabilization chamber, wherein the measured height of the float is a measure of the flow rate of the milk flow, wherein the sensor device is for instance provided with at least one sensor, such as an optical sensor, to measure the height at which the float is within the stabilization chamber (6), wherein for instance the at least one sensor is outside the stabilization chamber.

27. The milk meter according to at least clause 15, characterized in that the sensor device is arranged in and/or on the float, wherein the sensor device comprises an electronic measuring unit for contactlessly measuring the height within the stabilization chamber at which the float is floating on the milk in the stabilization chamber so that the measured height is a measure of the flow rate of the milk flow, and wherein the electronic measuring unit is provided with a transmitter unit for wirelessly emitting a signal which comprises information about the measured flow rate of the milk flow.

28. The milk meter according to clause 27, characterized in that the milk meter is furthermore provided with a magnetic unit for generating a magnetic field in the stabilization chamber such that the magnetic field varies in a height direction of the stabilization chamber, wherein the electronic measuring unit is configured for measuring the strength of the magnetic field, wherein the measured magnetic field strength of the magnetic field is a measure of the height within the stabilization chamber at which the float is floating on the milk in the stabilization chamber and whereby hence the measured field strength of the magnetic field is a measure of the flow rate of the milk flow.

29. The milk meter according to clause 28, characterized in that the electronic measuring unit is furthermore provided with a sensor such as a Hall sensor for detecting the magnetic field and a processor for processing measuring signals from the sensor to obtain information about the flow rate of the milk flow.

30. A system for milking animals comprising a milking device for milking animals and a milk meter according to any one of the preceding clauses which is connected with the milking device for measuring a flow rate of the milk flowing through the milk meter.

31. The system according to clause 30, characterized in that in the milk meter a vacuum pressure is present which is used for milking.

32. The system according to clause 31, characterized in that the second pressure, third pressure and fourth pressure are equal and, in use, is derived from the vacuum pressure in the milk meter.

33. The system according to any one of the preceding clauses 30-32, characterized in that the system further comprises pressure selection means for supplying to the operating opening, at will, an atmospheric pressure or a vacuum pressure which prevails in the milk meter and wherein the second, fourth and sixth pressure is equal to the pressure which prevails in the milking system, wherein, in use, the pressure prevailing in the milk meter is the vacuum pressure and wherein, at rest, the pressure prevailing in the milk meter is the atmospheric pressure.

The invention claimed is:

1. A milk meter comprising a sensor for measuring a flow rate of a milk flow, provided with an inlet to which, in use, the milk flow is supplied, an outlet where the milk flow leaves the milk meter, in use, and a liquid flow path extending from the inlet to the outlet, wherein in the liquid flow path a valve is included which can selectively take up a first or second valve position, wherein in the first valve position at least a first part of the liquid path is open and in the second valve position at least the first part of the liquid path is closed, wherein for operating the valve an operating opening is included in the valve for setting an operating pressure for selectively providing a pressure difference between the operating opening and the liquid flow path for exerting a force on the valve for enabling the operating of the valve, the operating opening being exterior to the liquid flow path, the milk meter being configured such that:

if at the operating opening a first pressure prevails and upstream of the valve in the liquid flow path a second pressure prevails, with the first pressure being higher than the second pressure and the difference between the first and the second pressure being greater than a first predetermined value, the valve is configured to take up the first valve position for enabling to measure, using the sensor, the flow rate of the milk flow;

if at the operating opening a third pressure prevails and upstream of the valve in the liquid flow path a fourth pressure prevails, with the difference between the third pressure and the fourth pressure being less than a predetermined second value, and the third pressure and the fourth pressure each being less than the first pressure, the valve is configured to take up the second valve position for enabling cleaning of the milk meter; and if at the operating opening a fifth pressure prevails and upstream of the valve in the liquid flow path a sixth pressure prevails, with the difference between the fifth pressure and the sixth pressure being less than a predetermined third value, and the fifth pressure and the sixth pressure each being greater than the second pressure, the valve is in the second valve position for assuming a rest mode.

2. The milk meter according to claim 1, wherein the first pressure, fifth pressure and sixth pressure are equal to each other.

3. The milk meter according to claim 2, wherein the first pressure is an atmospheric pressure.

4. The milk meter according to claim 1, wherein the second pressure, third pressure and fourth pressure are equal to each other.

5. The milk meter according to claim 4, wherein the second pressure is a vacuum pressure of a value which prevails in a milking system.

6. The milk meter according to claim 5, wherein the vacuum pressure is a pressure which, in use, prevails upstream of the valve in the liquid path and/or that the vacuum pressure is a reduced pressure relative to the atmospheric pressure.

7. The milk meter according to claim 1, wherein the valve is provided with a housing in which a cylinder is included, a piston which is included in the cylinder, a first inlet opening and an outlet opening, wherein the piston and the cylinder can move relative to each other between a first and second position and wherein the valve is furthermore provided with a spring element which presses the cylinder and the piston relative to each other in the direction of the second position, wherein in the first position the valve takes up the first valve position and a first fluid connection between the first inlet opening and the outlet opening is cleared, and in the second position the valve takes up the second valve position and the first fluid connection between the first inlet opening and the outlet opening is blocked, wherein the operating opening is in fluid communication with a space within the cylinder, and the inlet opening is in fluid communication with a space outside the cylinder within the housing, and wherein a pressure at the operating opening which is greater than a pressure which prevails in the space within the housing outside the cylinder presses the cylinder and the piston relative to each other in the direction of the first position against the force of the spring element.

8. The milk meter according to claim 7, wherein the first predetermined value is a pressure difference which generates a force which presses the cylinder and the piston relative to each other to the first position and which is greater than the force of the spring element between the cylinder and the piston.

9. The milk meter according to claim 1, wherein the first predetermined value is in the range of 0.4-1, that the second predetermined value is in the range of 0-0.5, and/or that the third predetermined value is in the range of 0-0.5.

10. The milk meter according to claim 7, wherein the piston is fixedly connected with the housing of the valve.

11. The milk meter according to claim 1, wherein the valve is furthermore provided with a flexible ring of which an outer edge is in particular detachably connected with the housing and an inner edge is connected with an outer side of the cylinder, such that a space contiguous to a first side of the ring is in fluid communication with the operating opening and a space contiguous to a second side of the ring opposite to the first side is in fluid communication with the first fluid connection of the valve, while in particular a spring element is formed by the flexible ring.

12. The milk meter according to claim 11, wherein the flexible ring is connected with a flexible sleeve in which at least a part of the cylinder is included while an opening of the sleeve and the inner edge of the ring are connected with each other.

13. The milk meter according to claim 12, wherein the flexible ring and the sleeve are made in one piece.

14. The milk meter according to claim 11, wherein the ring and/or the sleeve are made of silicones.

15. The milk meter according to claim 1, wherein the milk meter is furthermore provided with a stabilization chamber which is included in the liquid flow path and a float which is in the stabilization chamber and is configured to float on milk of the milk flow that is in the stabilization chamber, wherein the milk meter is configured such that a level of milk in the stabilization chamber depends on the flow rate of the milk flow, wherein the milk meter is provided with a buffer reservoir which is included upstream of the stabilization chamber in the liquid flow path, wherein in a sidewall of the buffer reservoir an outflow opening is provided which extends from a lowest point of the outflow opening upwardly and which is in fluid communication with the outlet, wherein a top of the buffer reservoir comprises an inlet opening which is in fluid communication with the inlet, and wherein the buffer reservoir and the stabilization chamber are connected with each other via a fluid connection, such that the buffer reservoir, the fluid connection and the stabilization chamber, in use, function as communicating vessels so that, in use, a level of the milk in the stabilization chamber is equal to a level of the milk in the buffer reservoir, wherein the milk meter is furthermore provided with at least one sensor device for determining the flow rate of the milk flow through the milk meter, wherein the milk meter is further provided with an outflow channel, wherein the outflow opening is in fluid communication with the outlet via the outflow channel.

16. The milk meter according to claim 15, wherein the first inlet opening of the valve is in fluid communication with the outflow opening of the buffer reservoir and the outlet opening of the valve is in fluid communication with the outlet of the milk meter, the first part of the liquid flow path extending from the outflow opening of the buffer reservoir to the outlet of the milk meter.

17. The milk meter according to claim 15, wherein the valve is furthermore provided with a second inlet opening which is in fluid communication with a drainage opening of the stabilization chamber, wherein in the first valve position at least a second part of the liquid path is closed and in the second valve position at least the second part of the liquid path is open, the second part of the liquid path extending through the drainage opening of the stabilization chamber to the outlet of the milk meter.

18. The milk meter according to claim 17, wherein the first position the valve takes up the first valve position and a second fluid connection between the second inlet opening of the valve and the outlet opening of the valve is blocked and in the second position the valve takes up the second valve position and the second fluid connection between the second inlet opening and the outlet opening is cleared.

19. The milk meter according to claim 7, wherein the first fluid connection of the valve is in the first part of the liquid flow path of the milk meter.

20. The milk meter according to claim 18, wherein the second fluid connection of the valve is in the second part of the liquid flow path of the milk meter.

21. The milk meter according to claim 1, wherein the valve is under a buffer reservoir and/or at a level above a lowest point of the outlet.

22. The milk meter according to claim 1, further comprising a pressure selector including valves for selectively setting a pressure at the operating opening.

* * * * *